United States Patent [19]
Ward et al.

[11] Patent Number: 5,722,690
[45] Date of Patent: Mar. 3, 1998

[54] SPLASH GUARD

[76] Inventors: Douglas K. Ward, 43 Ipswich Crescent, Toronto, Ontario, Canada, M3J 2N4; Kenneth J. Lott, 72 Pinebrook Crescent, Whitby, Ontario, Canada, L1R 2J7

[21] Appl. No.: 642,270

[22] Filed: May 3, 1996

[51] Int. Cl.⁶ ................................................. B62D 25/00
[52] U.S. Cl. ................................................. 280/851
[58] Field of Search ........................... 280/847, 848, 280/849, 851, 152.1, 152.3, 154

[56] References Cited

U.S. PATENT DOCUMENTS

| | | | |
|---|---|---|---|
| 4,315,634 | 2/1982 | Arenhold | 280/851 |
| 5,120,082 | 6/1992 | Ito | 280/851 |
| 5,489,108 | 2/1996 | Slade | 280/152.3 |

FOREIGN PATENT DOCUMENTS

| | | | |
|---|---|---|---|
| 3-273978 | 12/1991 | Japan | 280/847 |
| 126143 | 9/1949 | Switzerland | 280/848 |
| 2159785 | 12/1985 | United Kingdom | 280/851 |

*Primary Examiner*—Brian L. Johnson
*Assistant Examiner*—Frank Vanaman
*Attorney, Agent, or Firm*—Watts, Hoffman, Fisher & Heinke Co., L.P.A.

[57] ABSTRACT

A splash guard is adapted to fit any one of a set of vehicles having fender wheel well opening curvatures falling within a predetermined range while providing an aesthetic appearance of being custom molded for any vehicle of the set on which the splash guard is intended to be mounted. The splash guard includes a mounting section for connection to a fender, a splash arresting section connected to the mounting section and extending downwardly from the mounting section when the splash guard is in use, and a flange section connected to the mounting and arresting sections. The flange section includes a pleated portion enabling enhanced flange deformation to accommodate a wide range of vehicle configurations.

18 Claims, 5 Drawing Sheets

SPLASH GUARD

FIELD OF THE INVENTION

This invention relates to automotive splash guards and more particularly to a splash guard which will fit a number of different automobiles forming a set having similar configurations, the fit being in a manner which gives the appearance of a custom molded splash guard designed to fit any automobile of the set.

BACKGROUND OF THE INVENTION

U.S. Pat. No. 4,709,938, issued Dec. 1, 1987, under the title Splash Guard and assigned to the assignee of this patent discloses and claims an automotive splash guard that has been highly successful (the Splash Guard Patent). Initially with but three sizes of the guards of the Splash Guard Patent, it was possible to provide a set of splash guards for every then current automobile model of the so called "Big Three" U.S. auto manufacturers and a number of vehicles manufactured by others as well.

With the product of the Splash Guard Patent a mounting part is provided which is adapted to engage and be connected to a fender flange to the rear of a wheel well. Such connection is preferably with the clamp disclosed in U.S. Pat. No. 4,524,986 issued Jun. 25, 1985 to D. K. Ward under the title Splash Guard (the Clamp Patent). The splash guard includes a body portion connected to the mounting part and extending outwardly from it. The body portion together with the mounting part has a forward splash receiving surface oriented towards a wheel when in use and a rearward surface providing vehicle ornamentation. A flexible flange portion extends rearwardly from the body portion to engage vehicle surfaces rearward of the fender well. The flange has flexibility to flex over body moldings and curvatures.

While the guard of the Splash Guard Patent was quite suitable for the vehicles which were being manufactured in 1985 when the application that resulted in the Splash Guard Patent was filed, it no longer is satisfactory for accommodating the configurations of current vehicles. The number of sizes had increased to four for automobiles and three for light trucks but even with seven sizes the fit with some models was not satisfactory. More specifically, the current vehicles frequently have such things as projecting seams, under vehicle swoop or claddings which provide cross sectional contour variations in vehicle surfaces near fender wells which are beyond the deformation range of flanges of products made in accordance with the referenced Splash Guard Patent.

Moreover, because of the softer rolling shapes of current models and cab forward offset of wheels, greater numbers of lower panels are exposed to being damaged. Because of these greater numbers of exposed panels there is an increased demand for splash guards. Accordingly, there is a need for a splash guard construction which will permit a limited number of splash guard models to give the appearance of being custom molded for all current models of the Big Three U.S. manufacturers and other models as well.

SUMMARY OF THE INVENTION

With the splash guard of the present invention, with but three automobile and one truck sizes, it is possible to fit all currently manufactured Big Three automobile and light truck models and many foreign models as well, including those which have depending, welded together, flanges, relatively large swoop and claddings.

The splash guard of the present invention includes a mounting portion having spaced mounting and outer surfaces. When the splash guard is in use the mounting portion is secured to a flange of a fender well rearward of a tire. The mounting surface abuts the fender flange, while the outer surface is oriented forwardly to receive and deflect water and debris thrown up by a vehicle tire. The mounting portion is secured to the fender flange in a suitable and known fashion such as with biwax coated self tapping screws or the clamps disclosed in the Clamp Patent. The mounting portion extends from an inner side within the wheel well outwardly to an outward side external of the wheel well.

An intermediate connection portion extends rearwardly from the mounting portion at a location near the mounting portion outer side. When in use the connection portion overlies fender or other body panels extending rearwardly from a fender well. An external portion is joined to the intermediate portion at a generally L-shaped junction rearwardly of the mounting portion when the splash guard is in use. The external portion includes a forward surface which together with the outer surface on the mounting portion receives surface water and debris thrown up by a tire. The external portion has rearward surfaces which provide aesthetic enhancement to the vehicle. The external portion includes a section which extends downwardly and forwardly from the connection portion to a lower termination, generally in the plane of the mounting portion outer surface.

An extensible length flange projects rearwardly from a location adjacent the junction of the connection and external portions. The flange is for overlapping abutment with a body panel when the splash guard is in use. In the disclosed and preferred embodiment, the flange terminates at its base in a novel pleated portion extending from the remainder of the flange to a leg part of the L-shaped junction. The pleated portion enables extension of the effective length of the flange when, for example, a cladding is engaged by the flange. The preferred pleated portion comprises a pair of pleats with each pleat having a pair of generally triangular surfaces with the surfaces of each pair joined together at an obtuse angle when the splash guard is not in use. The pleated portion enables effective length extension through flange deformation around such body parts as depending side to quarter panel seams and plastic claddings.

Accordingly, the object of the invention is to provide a novel and improved splash guard adapted to give the appearance of being custom molded for any vehicle of a set upon which it is mounted with the set having an expanded range of vehicle configurations.

BRIEF DESCRIPTION OF THE DRAWINGS

FIG. 6b is a sectional view as seen from the plan indicated by the line 6—6 of FIG. 3 of a splash guard mounted on a vehicle different than the vehicle of FIG. 6a;

DETAILED DESCRIPTION OF THE PREFERRED EMBODIMENT

Figure 1:
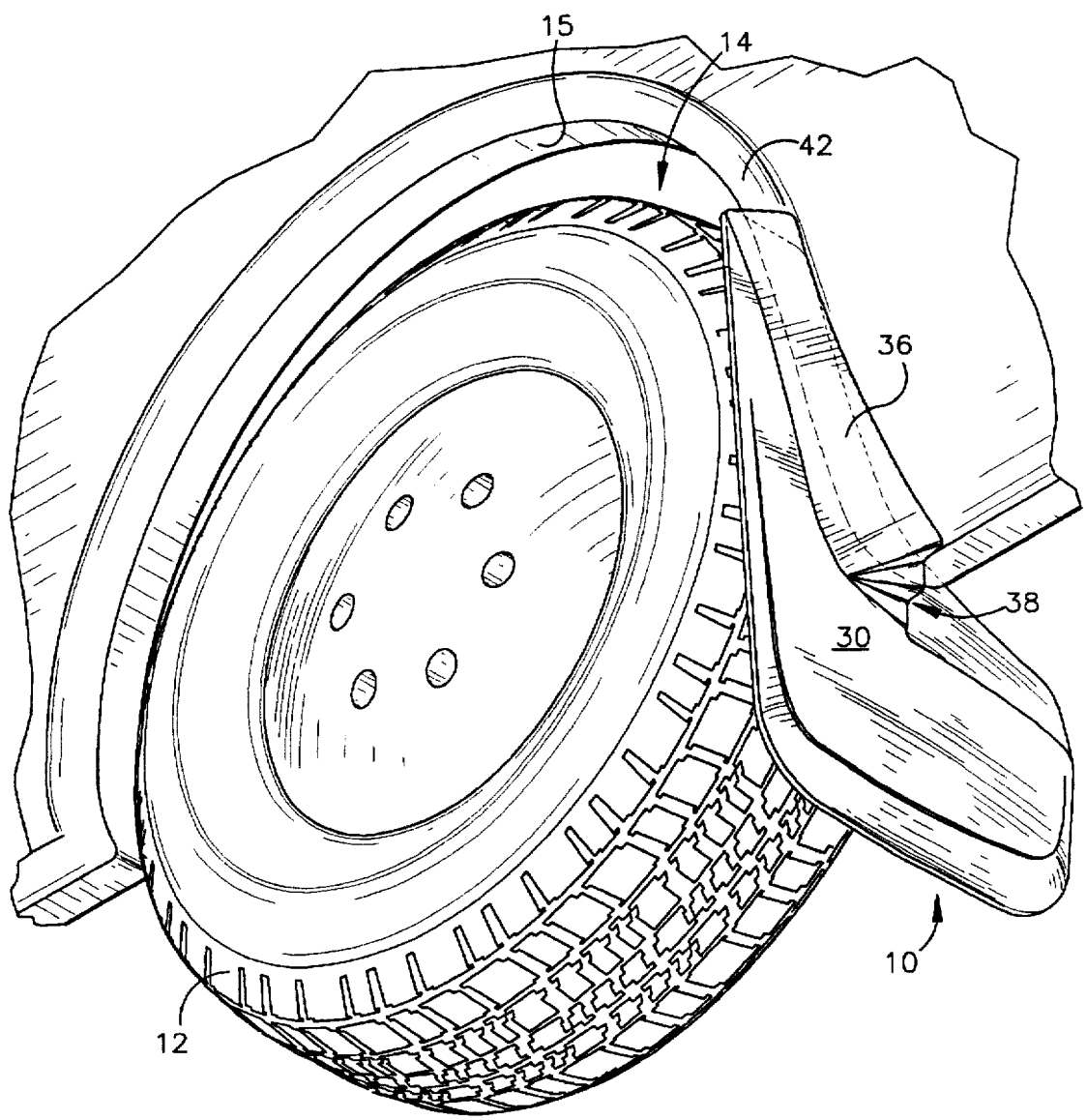
FIG. 1 is a perspective view of an automobile wheel and fender well, as well as a fragmentary portion of a vehicle body to which a splash guard of this invention has been attached.

Referring to the drawings, a unitary splash guard of integrally molded flexible plastic material is shown generally at 10. The depicted splash guard is one of three automobile models of the guard of this invention which collectively fit all current automobile models manufactured by the U.S. "Big Three" and certain additional automobiles manufactured by others. Each of the three splash guard models fits all automobile vehicles of a set having fender well and adjacent panel dimensions falling within a predetermined dimensional range and there are three such ranges.

Figure 6:
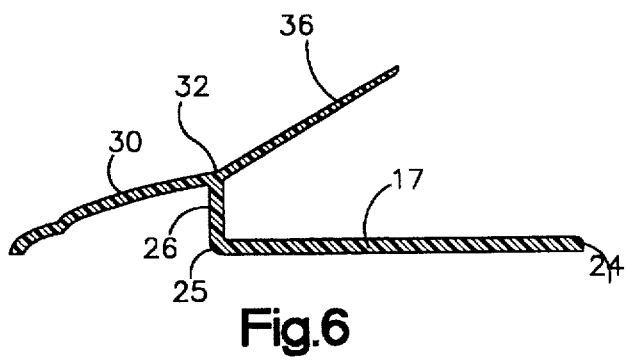
Figure 6A:
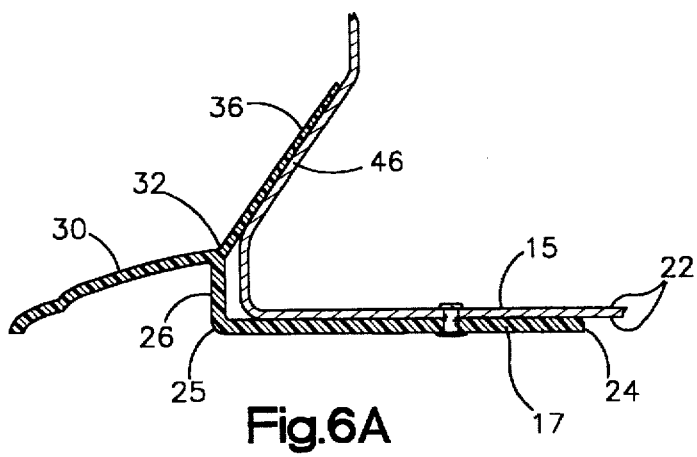
FIG. 6A is a sectional view as seen from the plane indicated by the line 6—6 of FIG. 3 of a splash guard mounted on a vehicle.
Figure 6B:
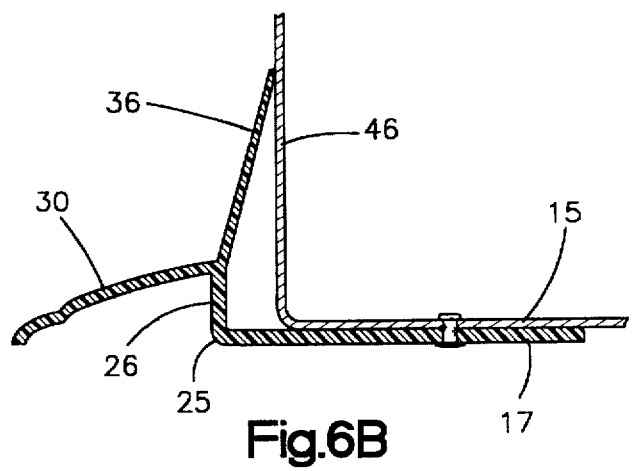
Figure 7:
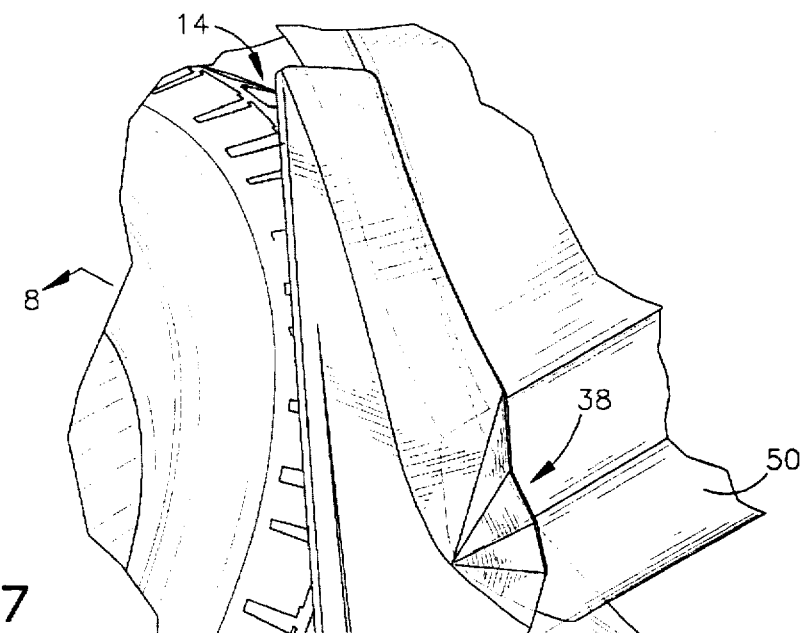
FIG. 7 is a fragmentary perspective view of a vehicle equipped with plastic cladding and a splash guard made in accordance with this invention.

As is best seen in FIGS. 1 and 7, one of the splash guards 10 when in use is mounted behind a vehicle wheel 12, projecting into a fender well 14 and secured to a fender flange 15. Each splash guard includes a mounting portion 17 having a rearward mounting surface 19 and an opposed outer surface 20. In use, the mounting portion 17 is secured to a fender flange 15 as indicated in FIG. 6a. A clamp fastener 22 is illustrated in FIG. 6 provides a suitable arrangement for mounting the splash guard on the vehicle. The illustrated clamp is described more fully in the Clamp Patent. The Clamp Patent is hereby incorporated by reference in its entirety. For many applications biwax coated self tapping screws are preferred because they provide a very positive mounting with minimal corrosion problems due to the coatings.

Figure 2:
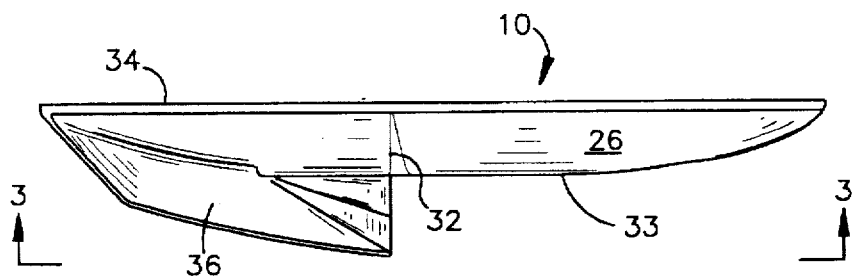
FIG. 2 is top plan view of the splash guard of this invention as seen from the plane indicated by the line 2—2 of FIG. 3.
Figures 3, 4:
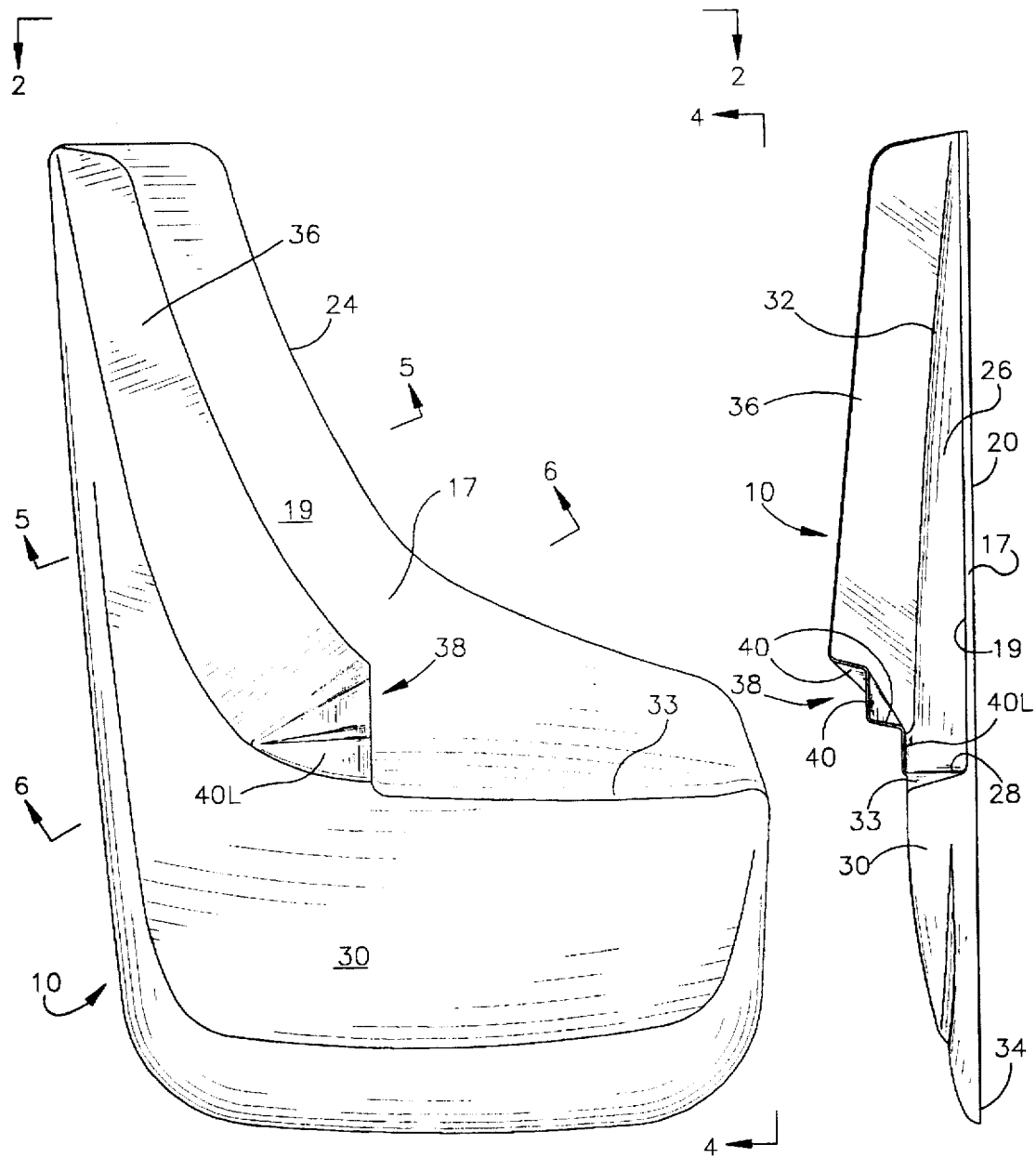
FIG. 3 is a rear elevational view of a splash guard as seen from the plane indicated by the line 3—3 of FIG. 2.
FIG. 4 is a side elevational view of the splash guard of this invention as seen from the plane indicated by the line 4—4 of FIG. 3.

While the mounting portion 17 is generally planar as is best seen in FIGS. 2 and 3, the mounting portion is flexible and will flex to the contour of the fender flange 15 to which it is mounted. The mounting portion has inner and outer sides 24, 25. The inner side 24 is within, while the outer side 25 is external of the fender well 14.

A generally L-shaped connection section 26 is provided. The connection section extends orthogonally from the mounting portion 17 in a direction which is rearward when the splash guard is mounted on a vehicle. More specifically, the connection section 26 extends rearwardly from the outer side 25 and a base 28 of the mounting portion. As is best seen in FIG. 4, an upstanding arm of the connection section 26 is generally triangular in shape, having its greatest width adjacent the mounting section base 28 and tapering to an apex at its top.

Figure 5:
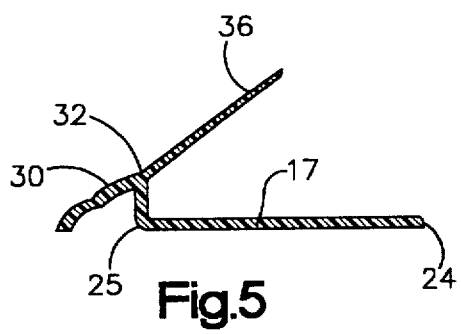
FIGS. 5 and 6 are sectional views of the splash guard respectively as seen from the planes indicated by the lines 5—5 and 6—6 of FIG. 3.

The splash guard also has an external section 30. The external section 30 extends outwardly and downwardly from an upstanding arm 32 and a lower leg 33 of an L-shaped junction with the connection section 26, FIGS. 2 and 4. As is best seen in FIGS. 5, 6 and 6a, the junction arm 32 is spaced rearwardly from the mounting portion. The external section flares forwardly as well as outwardly and downwardly to a termination in the plane of the outer surface 20. The external section has forward surfaces which together with the outer surface 20 are positioned to receive splashed water and road debris thrown up by the wheel 12 and protect the vehicle from impact from it. The external section 30 has a rearward surface which is designed to add aesthetic appeal to the vehicle.

A flange 36 flares rearwardly from the upstanding arm 32 of the junction. The flange terminates at its lower end in a pleated section 38 joined to the junction leg 33. The pleated section 38 is comprised of a pair of pleats each formed of a pair of triangular relatively moveable parts 40 joined together at an obtuse angle. The lowermost pleat part 40 is joined to the lower leg 33 of the junction near the connection of the lower leg and the upstanding arm 32.

Figure 8:
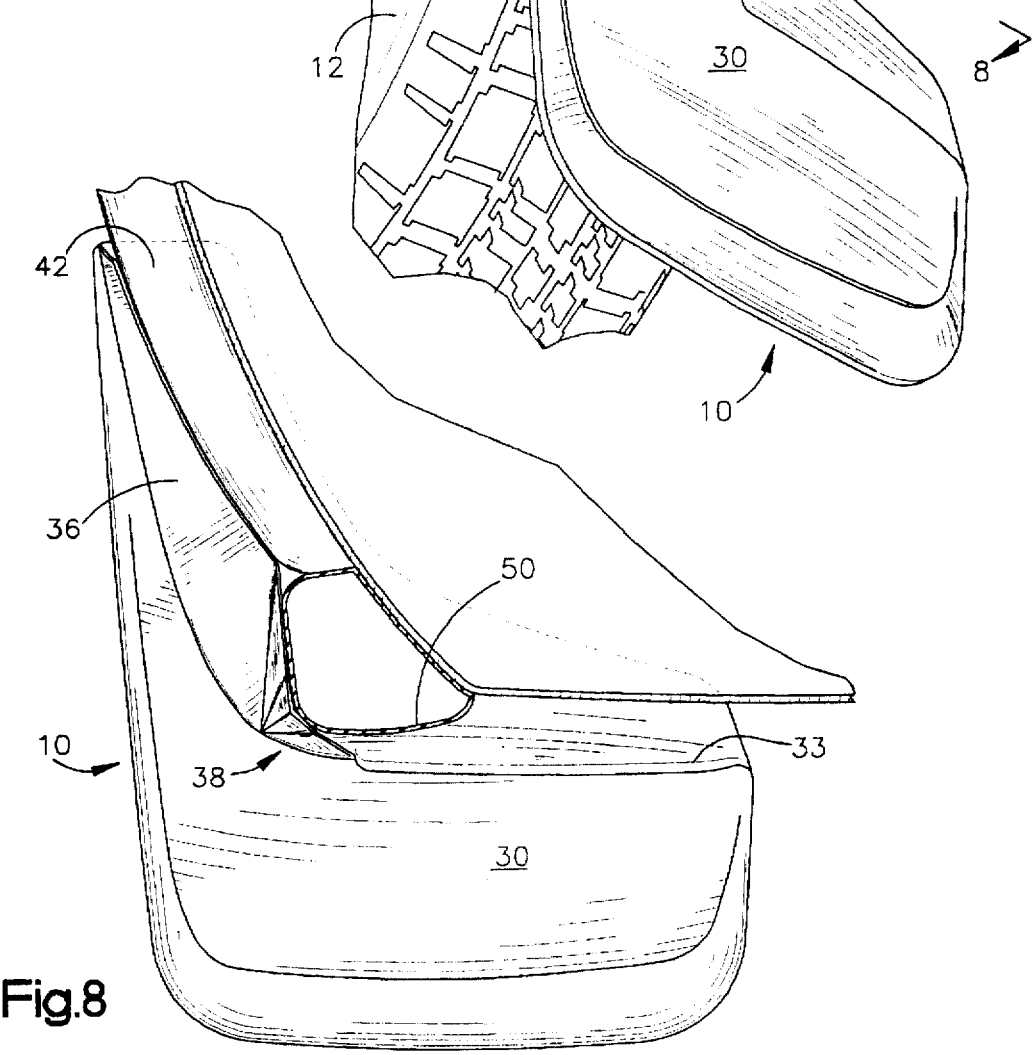
FIG. 8 is a sectional view of the vehicle and an elevational view of the splash of FIG. 7; and, FIG. 9 is an elevational view of the splash guard and a section view of the vehicle having a generally upright side panel.
Figure 9:
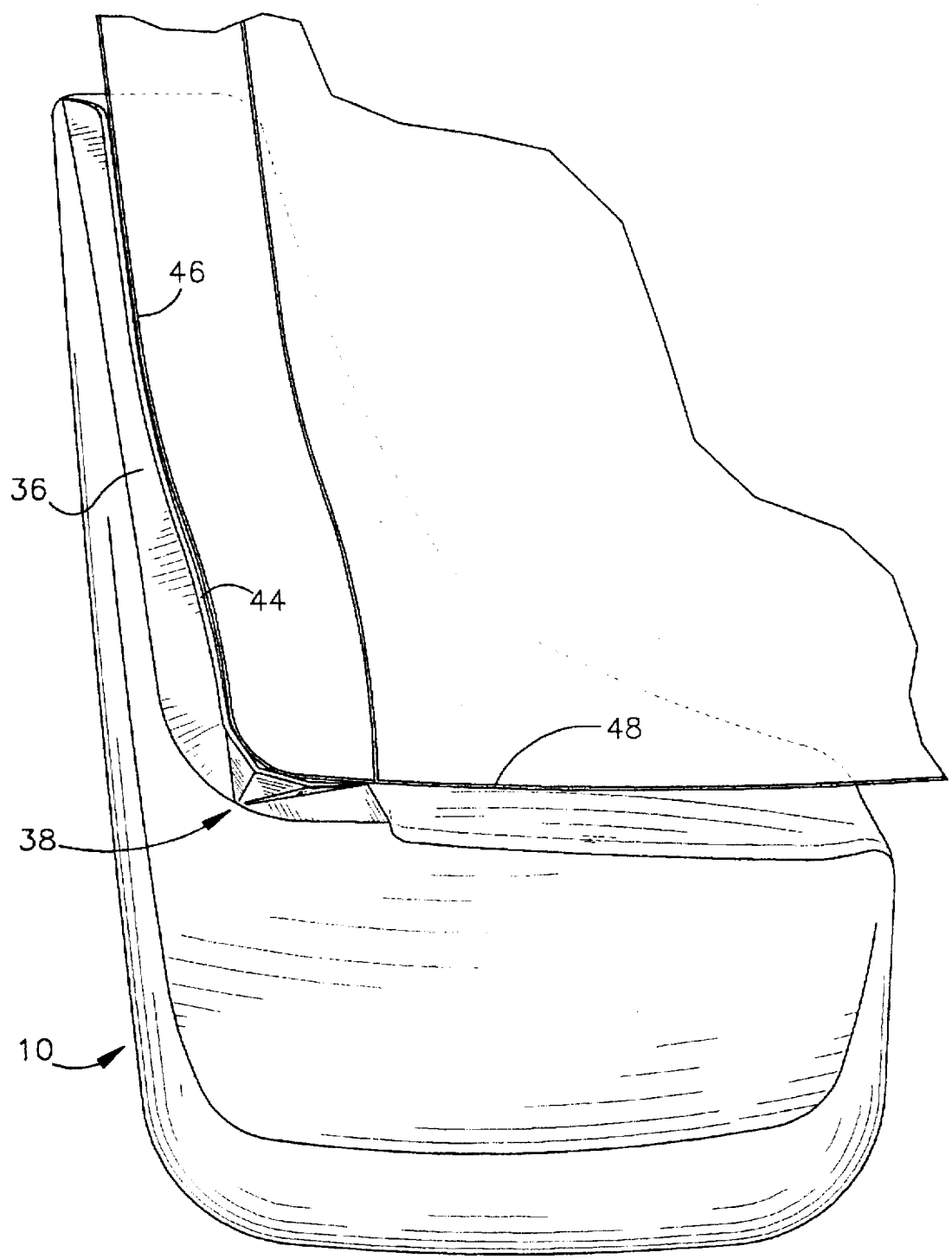

From an examination of FIGS. 1 and 7–9, it will be seen that the enhanced flexibility and extensible effective length of the pleated section 38, together with its termination a relatively short distance inwardly along the upstanding arm 32, enables connection to a wide range of body configurations and contours. Thus, the flange 36 readily flexes around a molding such as shown at 42 in FIG. 1. The flexing of the flange 36 also enables ready contour configuration to a convex section 44, FIG. 9, in a vehicle body in which a side panel 46 and a lower panel 48 are nearly perpendicular to one another. As illustrated in FIGS. 7 and 8, the pleated section also enables relative deformation to fit a vehicle configuration equipped with plastic cladding 50 of a type frequently provided in modern automobiles.

Although the invention has been described in its preferred form with a certain degree of particularity, it is understood that the present disclosure of the preferred form has been made only by way of example and that numerous changes in the details of construction, operation and the combination and arrangement of parts may be resorted to without departing from the spirit and the scope of the invention as hereinafter claimed.

We claim:

1. A splash guard adapted to fit any one of a set of vehicles having fender wheel well opening curvatures falling within a predetermined range while providing an aesthetic appearance of being custom molded for any vehicle of the set on which the splash guard is intended to be mounted, said splash guard comprising:

a) a mounting section for connection to a fender and when connected having a mounting surface engaging an inturned fender flange;

b) the mounting surface being adapted to assume a curvature substantially equal to a median curvature of said opening curvatures of the fender flanges of said set;

c) a splash arresting section connected to the mounting section and extending downwardly from the mounting section when the splash guard is in use;

d) a flange section connected to the mounting and arresting sections, the flange section being curved and resiliently deformable for establishing surface engagement with a fender outer surface portion adjacent a wheel well;

e) the flange section curvature being substantially equal to the median curvature of outer surface portions of the vehicles of said set; and, f) the flange section including a longitudinally extensible portion enabling enhanced flange deformation to accommodate a wide range of vehicle configurations.

2. The splash guard of claim 1 wherein the flange section is sufficiently deformable to accommodate projecting flanges of interconnected fender and body parts of vehicles of said set.

3. The splash guard of claim 1 wherein the splash guard is a molded unitary part.

4. The splash guard of claim 1 wherein the extensible portion is a pleated portion.

5. The splash guard of claim 4 wherein the pleated portion includes at least two pleats and wherein each pleat includes two facing generally triangular surfaces.

6. A unitary, molded plastic splash guard for use on any one of a set of vehicle fenders having fender configurations and dimensions falling within a predetermined range, the splash guard comprising:
   a) a main body having a mounting portion and a splash arresting portion;
   b) the mounting portion including a fender flange engaging surface adapted to abut and be connected to an inturned flange of a fender upon which the guard is mounted;
   c) the flange engaging surface being adapted to assume a curvature in a plane longitudinal of a vehicle upon which the guard is mounted substantially corresponding to any inturned flange curvature of the fenders of said set;
   d) a deformable, fender engaging, flange portion projecting from a juncture of the mounting and the splash arresting portions, the projection of the flange portion being in a direction which is rearward when the splash guard is in use on a vehicle;
   e) the flange portion having a curvature in a plane transverse of a vehicle on which the guard is adapted to be mounted substantially equal to a median transverse curvature of fender portions of vehicles of the set; and,
   f) a part of said flange portion being a lower part when the guard is mounted on a vehicle, the lower part having sections relatively moveable to one another and to enhance the extent of available flange portion deformation whereby to accommodate vehicle projections.

7. The splash guard of claim 6 wherein the relatively moveable sections are sections of pleats.

8. The splash guard of claim 6 wherein the relatively movable sections includes a plurality of pleats.

9. The splash guard of claim 8 wherein there are a pair of pleats.

10. The splash guard of claim 8 wherein each pleat includes a pair of generally triangular surfaces joined together at an obtuse angle.

11. A unitary splash guard of integrally molded, flexible plastic material for mounting on any vehicle of a set, each vehicle of the set having fender well and adjacent panel dimensions falling in a predetermined range, said splash guard comprising:
   a) a mounting portion having spaced mounting and outer surfaces, the mounting surface being for abutment with a fender flange of a vehicle of the set, the mounting portion having inner and outer sides and a base extending therebetween, the inner side being within and the outer side being external of a fender well of a vehicle of the set when the splash guard is mounted in its intended position in use;
   b) an intermediate connection portion extending rearwardly from the mounting portion outer side and base toward the rear of a vehicle when the splash guard is in use;
   c) an external portion extending from a junction with the connection portion, the external portion exterior extending outwardly and downwardly from the connection portion when the splash guard is in use such that the outer surface of the mounting portion and a forward surface of the external portion provide splash protection while rearward surfaces of the external portion afford aesthetic enhancement to the vehicle;
   d) the junction of the external portion with the connection portion being at locations spaced from the mounting portion, the external portion flaring outwardly from the connection portion and downwardly to a lower termination;
   e) a flange projecting outwardly from the external portion in a direction away from the mounting portion, the flange being connected to the external portion near the junction of the connection and external portions, the flange being for overlapping abutment with a body panel when the splash guard is in use; and,
   f) the flange including a pleated portion extending between a portion of said junction and the remainder of the flange.

12. The splash guard of claim 11 wherein the pleated portion comprises a plurality of pleats each having generally triangular surfaces joined together at obtuse angles.

13. The splash guard of claim 12 wherein each of the pleats comprises a pair of said generally triangular surfaces.

14. The splash guard of claim 12 wherein there are a pair of said pleats.

15. A unitary splash guard of integrally molded, flexible plastic material for mounting on any vehicle of a set, each vehicle of the set having fender well and adjacent panel dimensions falling in a predetermined range, said splash guard comprising:
   a) a generally planar mounting portion having spaced mounting and outer surfaces, the mounting portion being for flexing when in use to bring the mounting surface into curved abutment with a fender flange of a vehicle of the set, the mounting portion having inner and outer sides and a base extending therebetween, the inner side being within and the outer side being external of a fender well of a vehicle of the set when the splash guard is mounted in its intended position in use;
   b) an L-shaped intermediate connection portion extending generally orthogonally from the mounting portion outer side and base toward the rear of a vehicle when the splash guard is in use;
   c) an external portion extending from a junction with the connection portion, the external portion extending being outwardly and downwardly from the connection portion when the splash guard is in use such that the outer surface of the mounting portion and a forward surface of the external portion provide splash protection while rearward surfaces of the external portion afford aesthetic enhancement to the vehicle;
   d) the junction of the external portion with the connection portion being at locations spaced from the mounting portion, the external portion flaring downwardly from the connection portion to an outer termination generally in the plane of the mounting portion outer surface;
   e) a flange projecting outwardly from the external portion in a direction away from the mounting portion, the flange being connected to the external portion near the junction of the connection and external portions, the flange being for overlapping abutment with a body panel when the splash guard is in use; and,
   f) the flange including a pleated portion extending between a portion of a lower leg of said junction and the remainder of the flange.

16. The splash guard of claim 15 wherein the pleated portion comprises a plurality of pleats each having generally triangular surfaces joined together at obtuse angles.

17. The splash guard of claim 16 wherein each of the pleats comprises a pair of said generally triangular surfaces.

18. The splash guard of claim 16 wherein there are a pair of said pleats.

* * * * *